US009261072B2

(12) United States Patent
Davis

(10) Patent No.: US 9,261,072 B2
(45) Date of Patent: Feb. 16, 2016

(54) WIND TURBINE ELEVATOR FOR HOISTING A NAECELLE ALONG A TOWER AND PIVOTING THE NAECELLE AT A TOP OF THE TOWER

(76) Inventor: Daniel E. Davis, San Benito, TX (US)

(*) Notice: Subject to any disclaimer, the term of this patent is extended or adjusted under 35 U.S.C. 154(b) by 886 days.

(21) Appl. No.: 13/468,718

(22) Filed: May 10, 2012

(65) Prior Publication Data
US 2012/0328442 A1 Dec. 27, 2012

Related U.S. Application Data

(60) Provisional application No. 61/484,769, filed on May 11, 2011.

(51) Int. Cl.
B66B 9/02 (2006.01)
F03D 1/00 (2006.01)
B66C 23/18 (2006.01)

(52) U.S. Cl.
CPC .............. F03D 1/001 (2013.01); B66C 23/185 (2013.01); F05B 2230/61 (2013.01); F05B 2240/916 (2013.01); Y02E 10/726 (2013.01); Y02E 10/728 (2013.01); Y10T 29/49316 (2015.01)

(58) Field of Classification Search
CPC ..... B66B 9/16; F03D 1/001; Y10T 29/49316; B66C 23/185; F05B 2240/61; F05B 2240/916; Y02E 10/726; Y02E 10/728
USPC ......... 187/239, 240, 242, 244, 250, 270, 271, 187/277, 391; 52/123.1, 40, 119; 290/44, 290/55
See application file for complete search history.

(56) References Cited

U.S. PATENT DOCUMENTS

| 4,311,434 | A | | 1/1982 | Abe | |
|---|---|---|---|---|---|
| 4,467,889 | A | * | 8/1984 | Maubach et al. | 182/103 |
| 6,357,549 | B1 | * | 3/2002 | Brennan et al. | 182/133 |
| 6,505,785 | B2 | * | 1/2003 | Willis et al. | 290/55 |
| 6,888,264 | B1 | * | 5/2005 | Willis et al. | 290/55 |
| 7,442,009 | B2 | * | 10/2008 | Arel | 416/142 |
| 7,614,850 | B2 | | 11/2009 | Rogall | |
| 7,975,807 | B2 | * | 7/2011 | Franklin | 187/239 |
| 8,137,066 | B2 | | 3/2012 | Mayda | |
| 8,601,748 | B2 | * | 12/2013 | Delago et al. | 52/123.1 |
| 2002/0084142 | A1 | | 7/2002 | Brennan et al. | |
| 2006/0120809 | A1 | | 6/2006 | Ingram et al. | |
| 2009/0211174 | A1 | | 8/2009 | Henderson et al. | |
| 2009/0266648 | A1 | * | 10/2009 | Bazterra et al. | 187/270 |
| 2009/0267038 | A1 | | 10/2009 | Teichert et al. | |
| 2009/0280010 | A1 | | 11/2009 | Pederson | |
| 2009/0294219 | A1 | | 12/2009 | Oliphant et al. | |
| 2011/0084491 | A1 | * | 4/2011 | Kassner | 290/55 |

OTHER PUBLICATIONS

Energy Center of Wisconsin project summary—Project # BW-06 (D.H. Blattner & Sons)—The Self-Erecting Wind Turbine: Feasibility and Preliminary Design, Jan. 2007, 10 pages.

(Continued)

Primary Examiner — Anthony Salata
(74) Attorney, Agent, or Firm — Patterson & Sheridan, L.L.P.

(57) ABSTRACT

A method for assembling a wind turbine includes: unloading a nacelle and hub from a truck; connecting the nacelle and hub to a carriage of an elevator in a vertical position; connecting blades to the hub, thereby forming a rotor; raising the carriage, nacelle, and rotor along a tower to a top of the tower; and pivoting the carriage, nacelle, and rotor to a horizontal position at the top of the tower.

4 Claims, 13 Drawing Sheets

(56) References Cited

OTHER PUBLICATIONS

L. Fingerish et al.—Wind Turbine Design Cost and Scaling Model—National Renewable Energy Laboratory Technical Report NREL/TP-500-40566, Dec. 2006, 39 pages.
GE Energy brochure—Wind Service Solutions, 2008, 12 pages.
GE Energy brochure—Solutions for Wind Power Performance, 2009, 4 pages.
GE Energy brochure—2.5 MW Wind Turbine, 2009, 12 pages.
Scottish Enterprise prospectus and invitation to express interest—Orangutan Wind Turbine Access System, May 2010, 4 pages.
Vestas Wind Systems A/S brochure—FMV Jan. 28, 2010 New Vestas products, Feb. 1, 2010, 50 pages.
World Energy Council—2010 Survey of Energy Resources, Chapter 12—Wind Energy, 2010, pp. 500-542.
PCT International Search Report and Written Opinion dated Nov. 26, 2012, International Application No. PCT/US2012/037587.

* cited by examiner

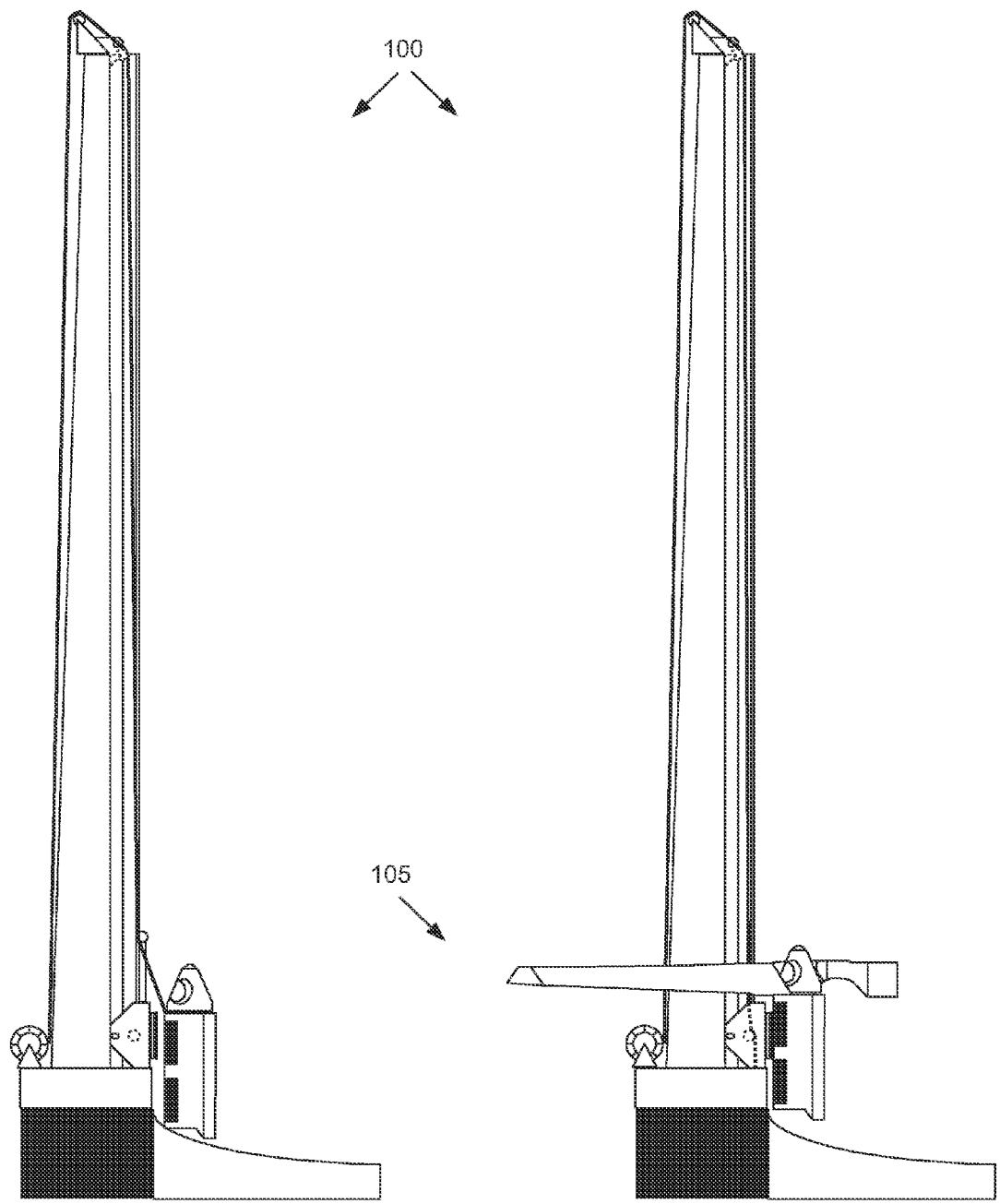

WIND TURBINE ELEVATOR FOR HOISTING A NAECELLE ALONG A TOWER AND PIVOTING THE NAECELLE AT A TOP OF THE TOWER

CROSS-REFERENCE TO RELATED APPLICATIONS

This application claims benefit of U.S. Provisional App. No. 61/484,769, filed May 11, 2011, which is hereby incorporated by reference in its entirety.

BACKGROUND OF THE INVENTION

1. Field of the Invention

Embodiments of the present invention generally relate to a wind turbine elevator.

2. Description of the Related Art

A wind turbine includes a rotor having a hub and multiple (typically three) blades connected to the hub. The rotor is connected to an input drive shaft of a gearbox. The blades transform wind energy into torque that drives a generator connected to an output shaft of the gearbox. The gearbox steps up the inherently low rotational speed of the rotor for the generator to efficiently convert the rotational mechanical energy to electricity, which is fed into a utility grid. Gearless direct drive wind turbines also exist. The drive shafts, generator, gearbox and other components are typically mounted within a nacelle that is positioned on top of a tower that may be a truss or tubular.

FIG. 1 illustrates a prior art lattice boom crawler crane having just assembled a wind turbine. To assemble the wind turbine, a high capacity lattice boom crane is required to hoist the nacelle on to the tower and then to hoist the rotor on to the nacelle. Since the wind turbines are usually located in remote locations, costs of deploying the crane to the wind turbine site can become substantial. Further, to increase capacity and efficiency, larger towers, longer blades, and heavier nacelles are currently in development, further exacerbating the installation cost (and maintenance cost if the nacelle must be removed) up to the point that it may be cost prohibitive to install the larger wind turbines, especially if the height capacity of the conventional lattice boom crane is exceeded.

SUMMARY OF THE INVENTION

Embodiments of the present invention generally relate to a wind turbine elevator. In one embodiment, a method for assembling a wind turbine includes: unloading a nacelle and hub from a truck; connecting the nacelle and hub to a carriage of an elevator in a vertical position; connecting blades to the hub, thereby forming a rotor; raising the carriage, nacelle, and rotor along a tower to a top of the tower; and pivoting the carriage, nacelle, and rotor to a horizontal position at the top of the tower.

In another embodiment, an elevator for a wind turbine includes: a tower having a base, a body, and a guide rail extending along the tower body; a carriage movable along the guide rail and having a bearing and rotary drive for receiving a nacelle in a vertical position; a drive system for raising the carriage and nacelle along the guide rail; and a pivot system for engaging the carriage when the carriage and nacelle arrive at the top of the tower.

In another embodiment, a method for assembling a wind turbine includes: unloading a nacelle and hub from a truck; loading the nacelle and hub on to a platform of an elevator in a horizontal position; raising the platform, nacelle, and hub along a tower to a top of the tower; after raising, conveying the nacelle and hub from the platform to the top of the tower; and connecting blades to the hub.

In another embodiment, an elevator for a wind turbine includes: a tower having: a base, a body, a bearing and rotary drive located at a top of the tower body for receiving a nacelle, and a guide rail extending along the tower body; a platform movable along the guide rail and having a conveyor for receiving the nacelle in a horizontal position and conveying the nacelle to the bearing and rotary drive; and a drive system for raising the platform and nacelle along the guide rail.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A illustrates unloading the nacelle and hub from a truck using a telescopic crawler crane. FIG. 2B illustrates carrying the nacelle and hub to a tower using the crane. FIG. 2C illustrates the nacelle and rotor connected to a carriage of the elevator in a vertical position. FIG. 2D is an enlargement of a portion of FIG. 2C. FIG. 2E illustrates the nacelle and rotor lifted to a top of the tower by the elevator. FIG. 2F illustrates the nacelle and rotor pivoted to a horizontal position by the elevator and ready for operation.

FIGS. 3A-3E illustrate an elevator and method of unloading and lifting a nacelle and rotor using the elevator, according to another embodiment of the present invention. FIG. 3A illustrates unloading the nacelle and hub from the truck using the elevator and a ramp. FIG. 3B illustrates moving the nacelle and hub to a tower using the elevator and ramp. FIG. 3C illustrates the nacelle and rotor connected to a carriage of the elevator in a vertical position. FIG. 3D illustrates the nacelle and rotor lifted to a top of the tower by the elevator. FIG. 3E illustrates the nacelle and rotor pivoted to a horizontal position by the elevator and ready for operation.

DETAILED DESCRIPTION

Figure 2A:
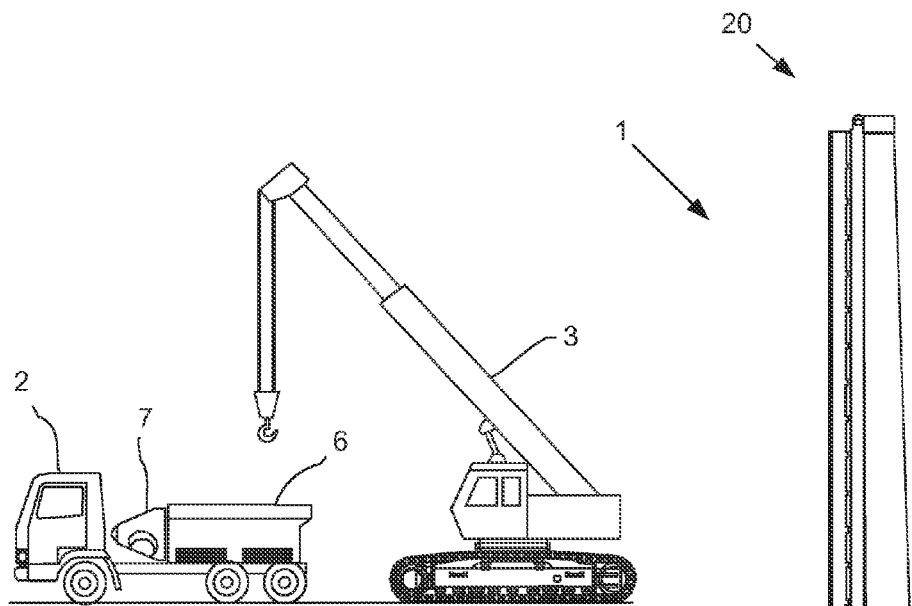
FIGS. 2A-2F illustrate an elevator and method of unloading and lifting a nacelle and rotor using the elevator, according to one embodiment of the present invention.
Figure 2B:
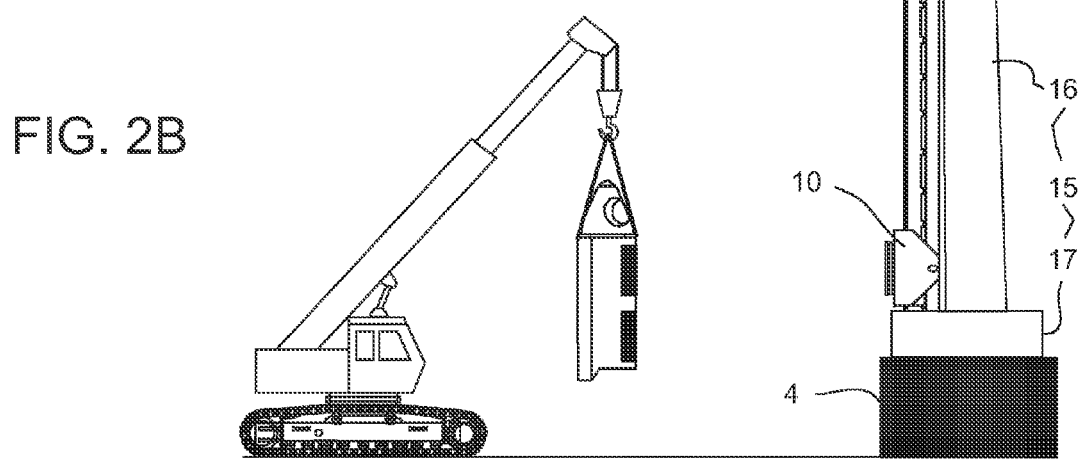

FIGS. 2A-2F illustrate an elevator 1 and method of unloading and lifting a nacelle 6 and rotor 7, 8 using the elevator, according to one embodiment of the present invention. FIG. 2A illustrates unloading the nacelle 6 and hub 7 from a truck 2 using a telescopic crawler crane 3. FIG. 2B illustrates carrying the nacelle 6 and hub 7 to a tower using the crane 3. The truck 2 may deliver the nacelle 6 and hub 7 from a factory (not shown) to a windfarm (not shown). Another truck (not shown) may deliver blades 8, one or more other trucks (not shown)

may deliver tower 15 in segments, and another truck (not shown) may deliver the telescopic crawler crane 3. Alternatively, the crane may be a rough terrain or all terrain crane and/or include other boom types, such as lattice or A-frame. Although shown as a cab chassis truck 3, the trucks may instead be a tractor-trailer. A pad 4 may be formed for receiving the tower 15. The tower 15 may include a base 17 for connection to the pad 4. The tower 15 may further include a body 16 for connection to the base 17. Once the pad 4 has been formed, the crane 3 may unload each tower segment from the trucks to the pad for assembly of the tower 15. The tower 15 may then be connected to the utility grid (not shown) so that the tower has electricity to operate the elevator 1. The tower body 16 may be semi-conical (shown) or semi-tubular (not shown) and have a flat face.

The crane 3 may then unload the nacelle 6 and hub 7 from the truck 2 and carry the nacelle and hub to the tower 15. The crane 3 may rotate the nacelle 6 and hub 7 from a horizontal position to a vertical position during unloading. A carriage 10 of the elevator 1 may be at the tower base 17 and locked/braked in position or resting on the tower base. The nacelle 6 and hub 7 may then be connected to the carriage 10, such as by a flanged connection. The nacelle 6 and hub 7 may be connected to the carriage 10 in the vertical position. The hub 7 may point upward (shown) or downward (not shown) in the vertical position.

Figures 2C, 2D:
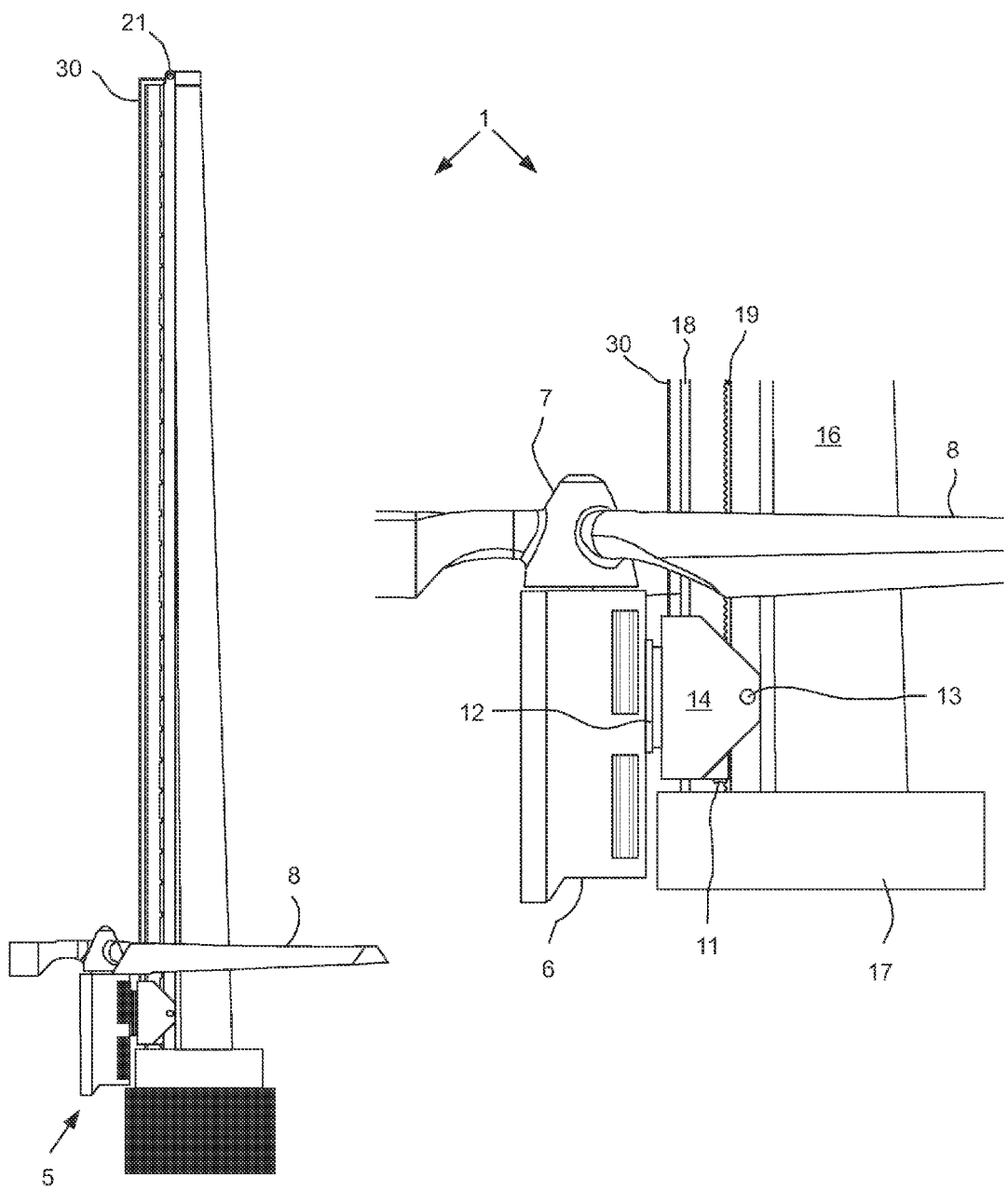

FIG. 2C illustrates the nacelle 6 and rotor 7, 8 connected to a carriage 10 of the elevator 1 in a vertical position. FIG. 2D is an enlargement of a portion of FIG. 2C. The elevator 1 may include a carriage 10, a drive system 11, 19, a guide system (only guide rail 18 shown), and a pivot system 20. The carriage 10 may include a body 14. A bearing 12 may be connected to the carriage body 14 for receiving the nacelle 6. The bearing 12 may connect the nacelle 6 to the carriage body 14 and allow for rotation of the nacelle 6 relative to the body subject to a rotary drive (not shown). The rotary drive may operated by a programmable logic controller (PLC, not shown) in order to point the nacelle 6 into the wind during operation. The rotary drive may include an electric motor (not shown) connected to the carriage body and rotationally connected to a pinion (not shown) which meshes with a gear (not shown) of the bearing 12. Operation of the rotary drive motor may rotate the nacelle 6 relative to the carriage body 14. The rotary drive may further include a lock (not shown) for selectively rotationally connecting the nacelle relative to the carriage body. The lock may include a gear tooth (not shown) selectively engageable with the bearing gear via operation of a linear actuator (i.e., a solenoid) and a proximity or limit sensor to verify engagement of the tooth with the gear. Engagement of the gear with the tooth may rotationally connect the nacelle 6 to the carriage body 14. Verification of engagement by the proximity/limit sensor may also prevent operation of the rotary drive motor when the rotary drive is locked. Alternatively, the lock may include a disk (not shown) incorporated in the rotary drive motor and a retainer for retaining the disk.

The guide system may include a trolley (not shown) and a guide rail 18. The guide rail 18 may be connected to a flat face of the tower body 16, such as by fastening or welding. As with the tower 15, the guide rail 18 may include a plurality of segments and each segment may be connected to a respective tower segment. The trolley may be disposed in and connected to the carriage body 14. The trolley may include an actuator for selectively engaging the trolley with the guide rail 18. When engaged with the guide rail 18, the trolley may connect the carriage body 14 to the guide rail 18 while allowing relative longitudinal movement of the carriage body relative to the guide rail subject to operation of the drive system.

The drive system 11, 19 may include an electric drive motor (not shown), a roller, such as a pinion 11, and a rack 19. The pinion 11 may be engageable with the rack 19 and the rack may extend along the guide rail 18. A rotor of the drive motor may be rotationally connected to each pinion 11 and a housing of the drive motor may be connected to the carriage body 14. The pinion 11 may be supported by the carriage body 14 so that the pinion may rotate relative thereto. Operation of the drive motor may lift the carriage 10 longitudinally upward along the tower. For lowering the carriage 10, the drive motor may be speed controllable to manage descent. Additionally, the drive system may further include a lock to selectively longitudinally support the carriage 10 from the tower 15. Alternatively, the drive system may further include a brake to control descent of the carriage 10.

A power cable 30 may be lowered from a top of the tower 15 using a winch (not shown) disposed in the tower and connected to the drive system and trolley actuator. Alternatively, the power cable winch may be located at a bottom of the tower or the rail 18 may have a conductor extending therealong and the carriage may include a sliding/rolling contact for engaging the rail conductor. The hub 7 may already be locked from rotating relative to the nacelle 6. The bearing 12 may also already be in a locked position. The trolley may already be in the engaged position. The blades 8 may then be connected to the hub 7, collectively rotor 7, 8. The drive motor may then be operated to lift the assembled nacelle 6, rotor 7, and carriage 10, collectively head 5, along the rail 18 until the head reaches a top of the tower 15.

Figure 2E:
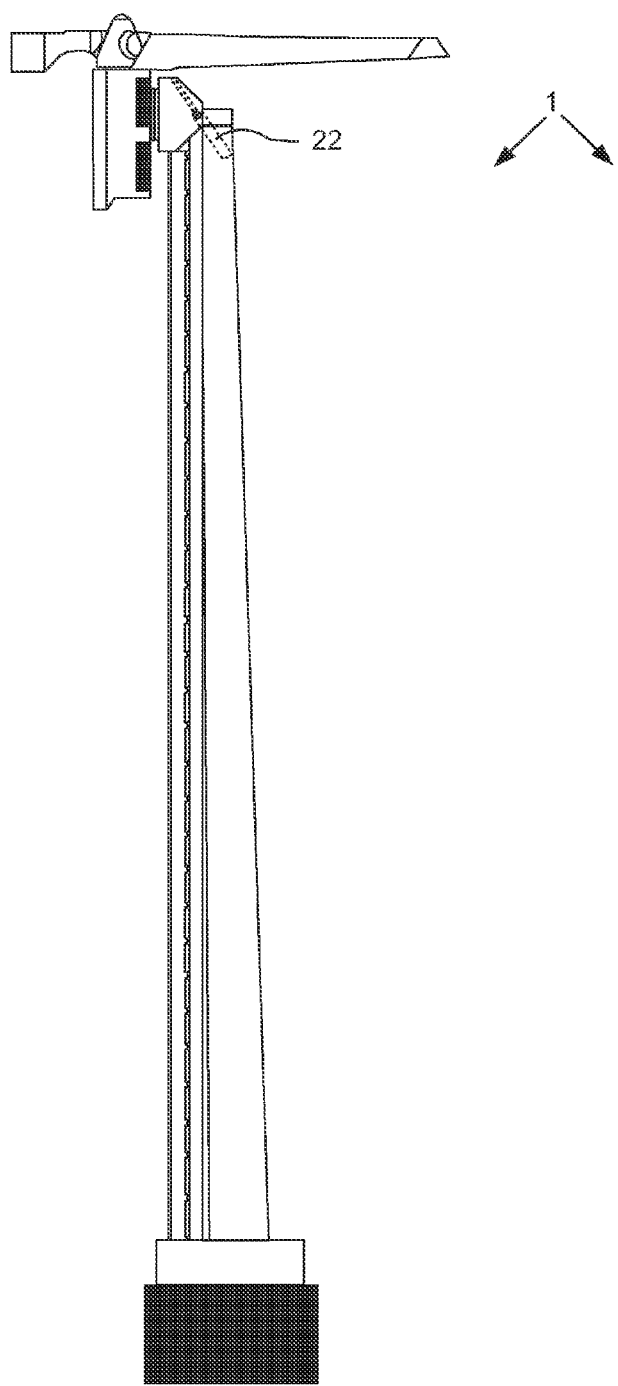

FIG. 2E illustrates the head 5 lifted to a top of the tower 15 by the elevator 1. The pivot system 20 may include a stop (not shown) having a proximity or limit sensor in communication with the PLC disposed in the tower 15. In response to detection of the head 5 at the top of the tower 15, the PLC may lock the drive motor and engage pivot fasteners (not shown) with corresponding holes 13, 21 formed in the carriage body 14 and the rail 18, respectively, thereby pivoting the carriage body 14 to the rail 18. The pivot fasteners may each be engaged and retracted by a fastener actuator, such as a solenoid and spring. Each pivot actuator may include a proximity or limit sensor in communication with the PLC to verify engagement of the pivot fasteners with the carriage body holes. Once the PLC has verified engagement, the PLC may deactivate the driver motor and disengage the trolley from the guide rail 18.

The pivot system 20 may further include a linear actuator 22, such as an electric motor and lead screw, disposed in a top of the tower 15 and pivoted to the tower. An end of the lead screw distal from the motor may have a clamp and a clamp actuator in communication with the PLC via flexible leads. The PLC may then operate the clamp actuator to engage a pivot rod or pin (not shown) connected to the carriage body 14, thereby also pivoting the linear actuator 22 to the carriage body. Once connected, the linear actuator 22 may be operated to contract the lead screw, thereby pivoting the head 5 from the vertical position to the horizontal position. As the head 5 is pivoted, a tipping point may be reached. The linear actuator may be speed controlled to manage pivoting of the head after the tipping point is reached. Alternatively, a damper (not shown) may also be pivoted to the tower 15 and the carriage body 14 to control pivoting after tipping.

Figure 2F:
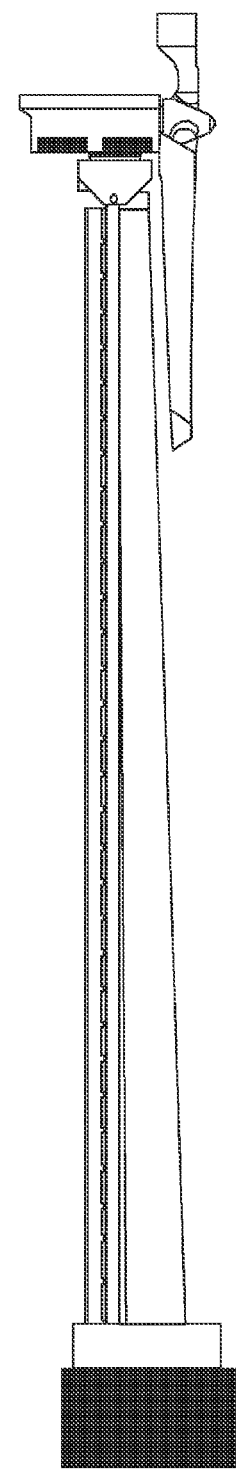

FIG. 2F illustrates the head 5 pivoted to the horizontal position by the elevator 1 and ready for operation. Once the head 5 has been pivoted to the horizontal position, the linear actuator may be locked. A second power cable (not shown)

may be connected from a power converter (not shown) located in the tower 15 and connected to the utility grid and the generator (not shown) of the nacelle 6. The tower PLC may also be connected to various sensors and actuators of the nacelle 6 and the rotary drive of the carriage via a third power and data cable. Alternatively, the nacelle may have its own PLC and the tower PLC may be connected to the nacelle PLC. Alternatively, one or more of the pivot system actuators may be omitted and the functions performed manually.

Should the nacelle 6 and/or rotor 7, 8 need to be serviced, operation of the elevator 1 may be reversed to pivot the head 5 to the horizontal position and lower the head to the tower base 17. The nacelle 6 and/or rotor 7, 8 may then be serviced at the tower base 17 or removed and delivered to a service facility. Additionally, if severe weather, such as a hurricane, is forecast, the head 5 may be lowered to the tower base 17 to offer more protection to the head 5 (and the tower 15) and then returned to service using the elevator 1.

FIGS. 3A-3E illustrate an elevator 100 and method of unloading and lifting a nacelle 6 and rotor 7, 8 using the elevator, according to another embodiment of the present invention. The truck 2 may deliver the nacelle 6 and hub 7 from the factory to the windfarm. Another truck may deliver blades 8, one or more other trucks may deliver tower 115 in segments, another truck may deliver a mobile crane (not shown), and another truck may deliver a ramp 140. The mobile crane may be any of the types, discussed above for the crane 3, except that the mobile crane need not have height capacity for assembling the tower 115. A pad 104 may be formed for receiving the tower 115. The tower 115 may include a base 117 for connection to the pad 104. The tower 115 may further include a body 116 for connection to the base 117.

Once the pad 104 has been formed, the mobile crane 3 may unload a first tower segment from the truck and onto the pad 104. The first tower segment may then be connected to the utility grid (not shown) so that the tower has electricity to operate the elevator 100. The mobile crane 3 may then be used to assemble a self-erecting crane (not shown) on to the first tower segment. The self-erecting crane may be connected to the utility grid. Once assembled, the self-erecting crane may lift itself from the first tower segment to a sufficient height above the first tower segment for loading a second tower segment. The self-erecting crane may then load the second tower segment from the truck and over the first tower segment. The self-erecting crane may then lift itself from the second tower segment for receiving a third tower segment and the process may be repeated until the tower 115 is assembled. Once the tower 115 is assembled, the self-erecting crane may be lowered to the base 117 and disassembled from the tower 115 using the mobile crane. The tower body 116 may be semi-conical (shown) or semi-tubular (not shown) and have a flat face.

Figure 3A:
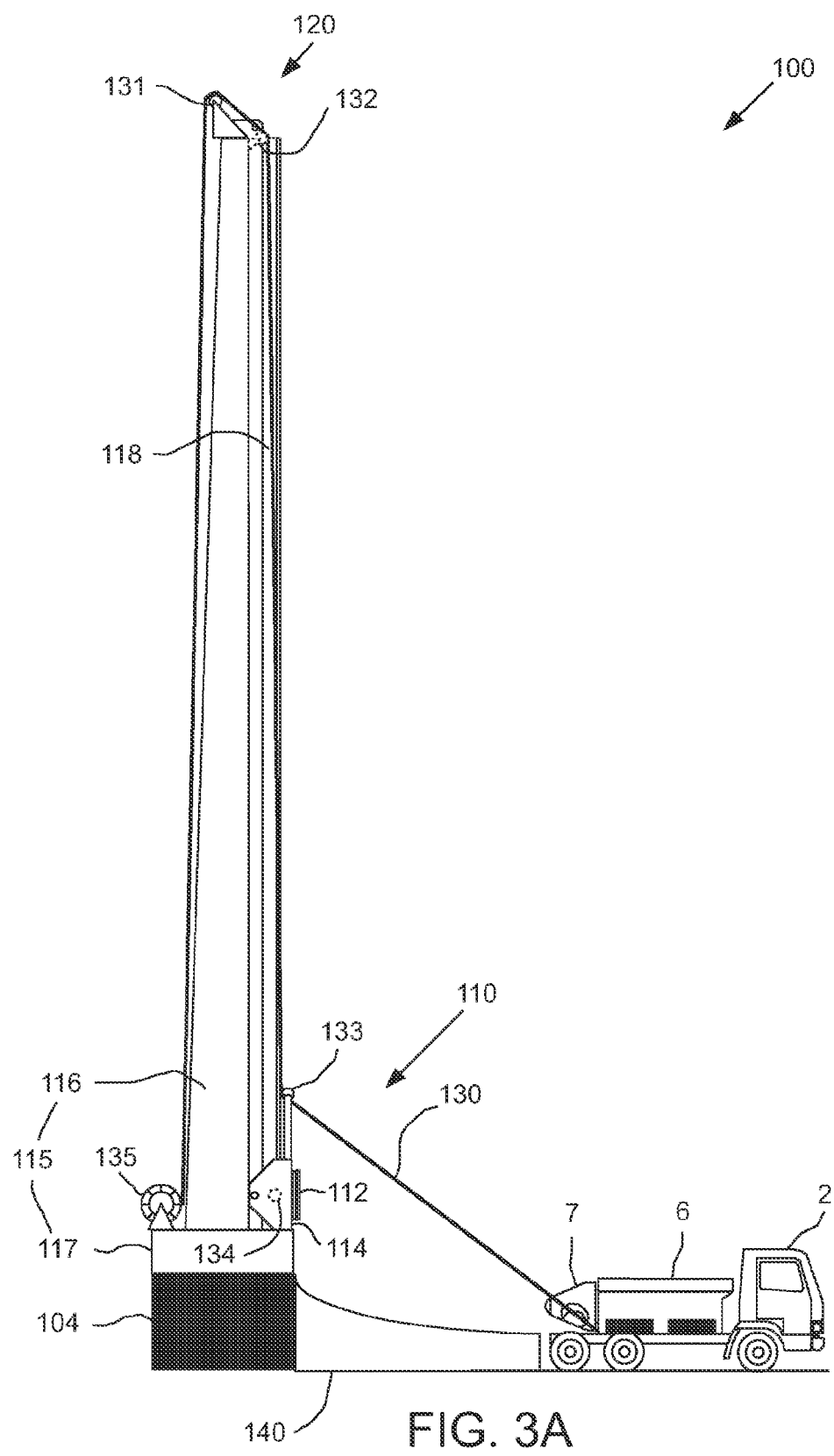

FIG. 3A illustrates unloading the nacelle 6 and hub 7 from the truck 2 using the elevator 100 and the ramp 140. FIG. 3B illustrates moving the nacelle 6 and hub 7 to a tower 115 using the elevator 100 and ramp 140. The elevator 100 may include a carriage 110, a drive system 130, 135, a guide system (only guide rail 118 shown), and a pivot system 120. The carriage 110 may include a body 114. A bearing 112 may be connected to the carriage body 114 for receiving the nacelle 6. The bearing 112 may connect the nacelle 6 to the carriage body 114 and allow for rotation of the nacelle relative to the carriage body subject to a rotary drive (not shown). The bearing 112 and rotary drive may be similar or identical to the bearing 12 and rotary drive, discussed above. The guide system may include a trolley (not shown) and a guide rail 118. The guide system may be similar or identical to the guide system, discussed above.

The drive system may include an electric lifting winch 135, wire rope 130, and one or more sheaves 131-134. The winch 135 may include a drum having the wire rope 130 wrapped therearound and an electric motor (not shown). The drum may be rotatable relative to a housing of the winch. The drum may be driven by the electric motor (not shown) connected to the utility grid. The wire rope 130 may extend from the winch drum along the tower 115 and through the sheaves 131-133 and be connected to the nacelle 6. Winding of the wire rope 130 around the winch drum may pull the nacelle 6 along the ramp 140 to the carriage 110. The nacelle 6 may slide along the ramp 140 or the ramp may include a dolly (not shown) for rolling the nacelle along the ramp. For lowering the carriage 110, the winch motor may be speed controllable to manage descent. The winch 135 may further include a lock to selectively longitudinally support the carriage 110 from the tower 115. Alternatively, the winch 135 may further include a brake to control descent of the carriage. Alternatively, the winch motor may be hydraulic instead of electric and the tower 115 may include a hydraulic power unit (HPU) for driving the winch motor.

The wire rope 130 may be connected to the nacelle 6. The winch 135 may be operated to pull the nacelle 6 along the ramp 140, thereby standing the nacelle from the horizontal position to the vertical position. Once the nacelle 6 has reached the bearing 112, the winch 135 may be locked and the nacelle may be connected to the bearing. The nacelle 6 and hub 7 may be connected to the carriage 110 in the vertical position. The hub 7 may point upward (shown) or downward (not shown) in the vertical position. The carriage 110 may be resting on the tower base 117.

FIG. 3C illustrates the nacelle 6 and rotor 7 connected to the carriage 110 in the vertical position. Once the nacelle 6 has been connected to the bearing 112, the winch 135 may be unlocked and the wire rope 130 slacked. The extension sheave 133 may be retracted into the carriage body 114 or removed. The wire rope 130 may be connected to the carriage body 114. The blades 8 may then be connected to the hub 7. The winch 135 may then be operated to lift the head 105 along the rail 118 until the head reaches a top of the tower 115.

Figure 3D:
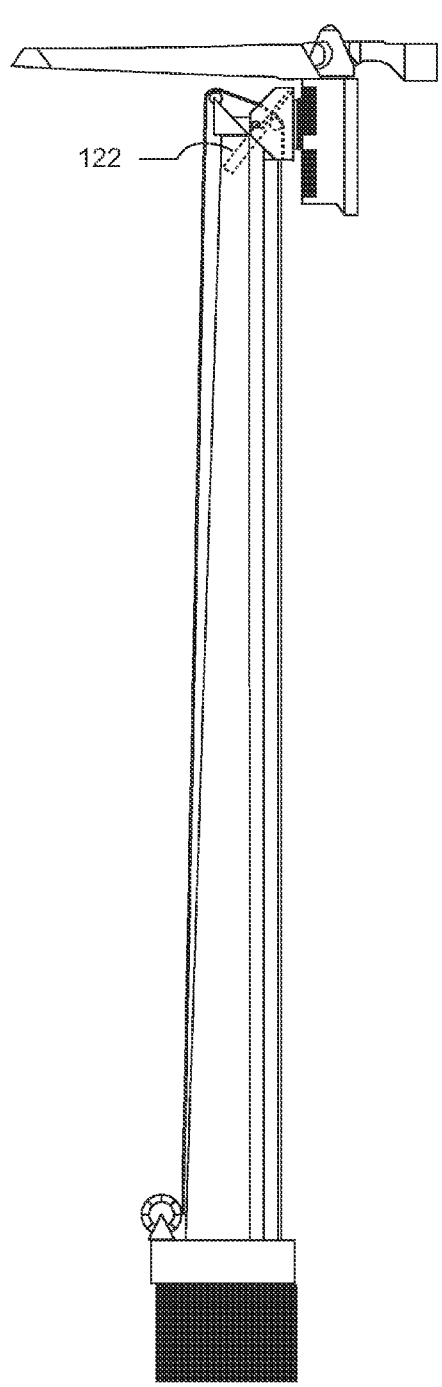

FIG. 3D illustrates the head 105 lifted to a top of the tower 115 by the elevator 100. The pivot system 120 may include a stop (not shown) having a proximity or limit sensor in communication with the PLC disposed in the tower 115. In response to detection of the head 105 at the top of the tower 15, the PLC may lock the winch and engage pivot fasteners (not shown) with corresponding holes formed in the carriage body 114 and the rail 118, respectively, thereby pivoting the carriage body 114 to the rail 118. The pivot fasteners and fastener actuators may be similar or identical to those discussed above for the elevator 1.

To control pivoting after tipping, the pivot system 120 may further include a linear actuator 122 disposed in a top of the tower 115 and pivoted to the tower. The linear actuator 122 may be similar to the linear actuator 22 of the elevator 1 except that the linear actuator 122 may or may not include the clamp. The pivot 120 system may also include a damper (not shown, also may or may not be pivoted to the carriage body). The pivot system 120 may further include a power coupling (not shown). The power coupling may include a plug and a plug actuator. The plug may be aligned with a socket disposed in the carriage body 114 when the head 105 has reached the stop. The plug actuator may be in communication with the tower PLC. The PLC may operate the plug actuator to engage the plug with the socket. The socket may be in communication with the trolley actuator such that the PLC may disengage the trolley from the rail 118. Alternatively, power communication between the trolley actuator and the tower PLC may be provided by wireless (i.e., inductive or capacitive) couplings or an armored electric cable may be used instead of the wire rope 130.

Once the PLC has verified engagement of the pivot fasteners, the PLC may disengage the trolley, unlock the winch 135, and operate the winch to pivot the head 105 from the horizontal position to the tipping point and the linear actuator 122 may control the pivoting after tipping.

Figure 3E:
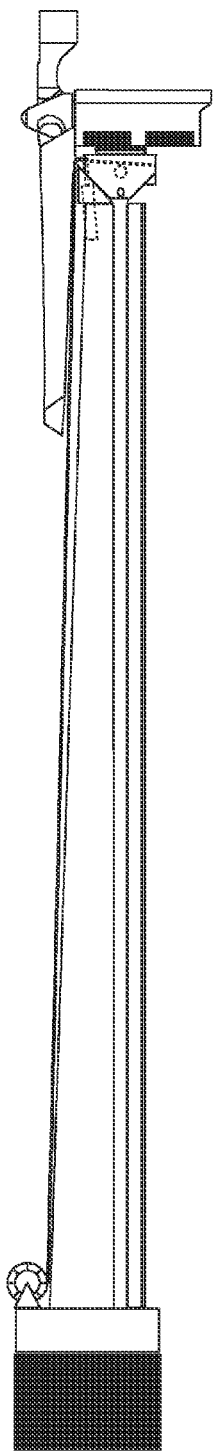

FIG. 3E illustrates the head 105 pivoted to a horizontal position by the elevator and ready for operation. Once the head 105 has been pivoted to the horizontal position, the winch may be locked, the linear actuator 122 may be locked, and/or the pivot system 120 may further include a lock and lock actuator (not shown). To pivot the head 105 back to the vertical position for lowering the head back to the tower base 117 (i.e., for maintenance or severe weather), the linear actuator 122 may be operated to push the head back to the tipping point and the winch 135 and/or the linear actuator may control tipping. Once pivoted, the winch 135 may be operated to lower the head 105 to the base 117.

A second power cable (not shown) may be connected from a power converter (not shown) located in the tower 115 and connected to the utility grid and the generator (not shown) of the nacelle 6. The tower PLC may also be connected to various sensors and actuators of the nacelle 6 and the rotary drive of the carriage via a third power and data cable. Alternatively, the nacelle may have its own PLC and the tower PLC may be connected to the nacelle PLC. Alternatively, one or more of the pivot system actuators may be omitted and the functions performed manually.

Figure 1:
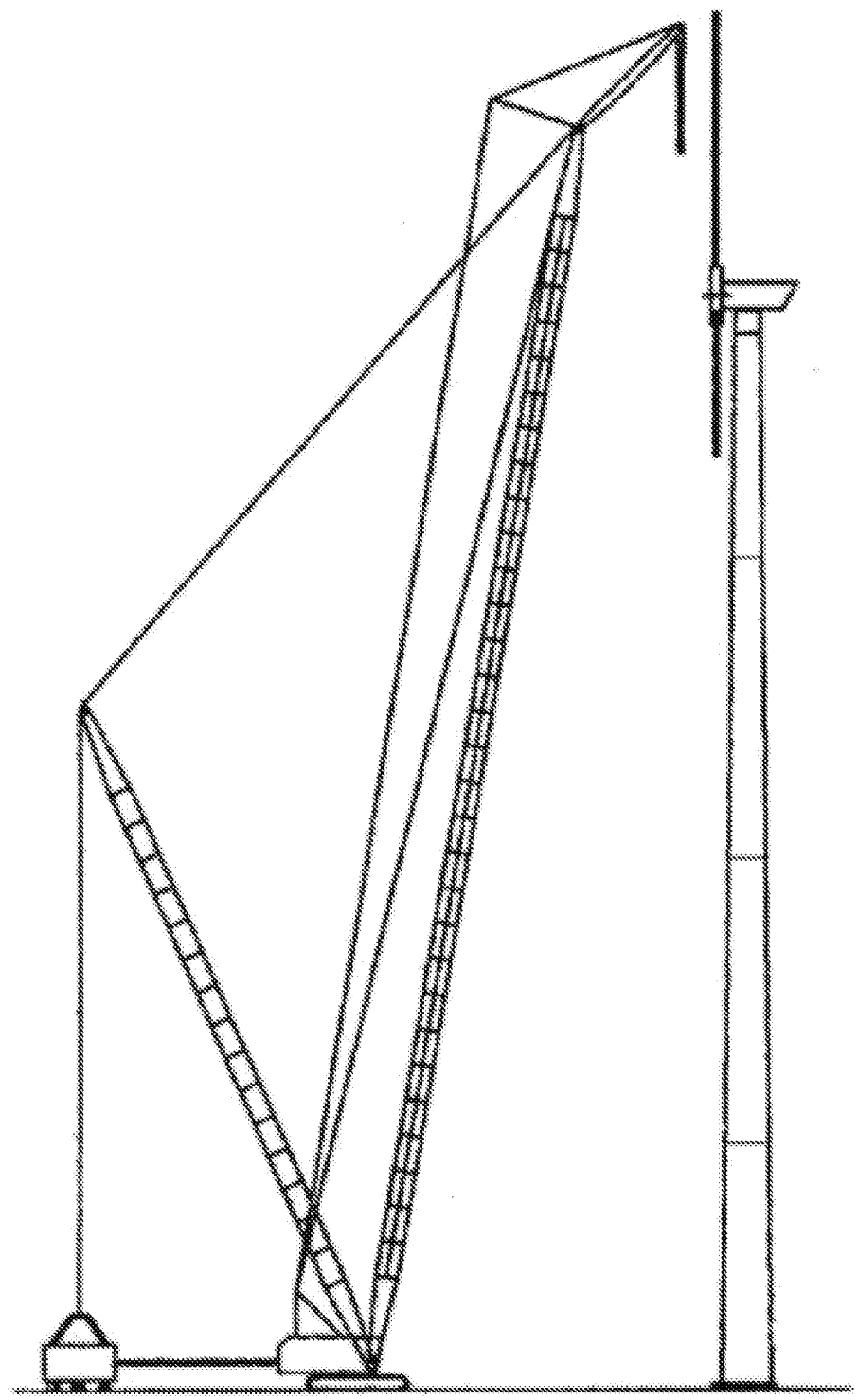
FIG. 1 illustrates a prior art lattice boom crawler crane having just assembled a wind turbine.

Advantageously, the elevators 1, 100 may be used to install the nacelle 6 and rotor 7, 8 with a much smaller and inexpensive telescopic boom crane 3 and mobile crane, respectively, instead of the lattice boom crane of FIG. 1. Further, in the event of severe weather, one or more of the elevators 1, 100 may be operated to lower the nacelle 6 and rotor 7 remotely from a control station (not shown) without having to deploy personnel and equipment to the wind farm.

Alternatively, the crane 3 may be used to assemble the tower 115 instead of the self erecting tower and/or to unload the nacelle 6 and rotor 7, 8 instead of using the ramp 135. Alternatively, the self-erecting crane may be used to assemble the tower 15 instead of the crane 3 and/or the elevator 1 may further include a winch and a ramp to unload the nacelle and rotor. Additionally, either of the elevators 1, 100 may be retrofit to an existing tower using pipe clamps (not shown).

Figures 4A, 4B, 4C:
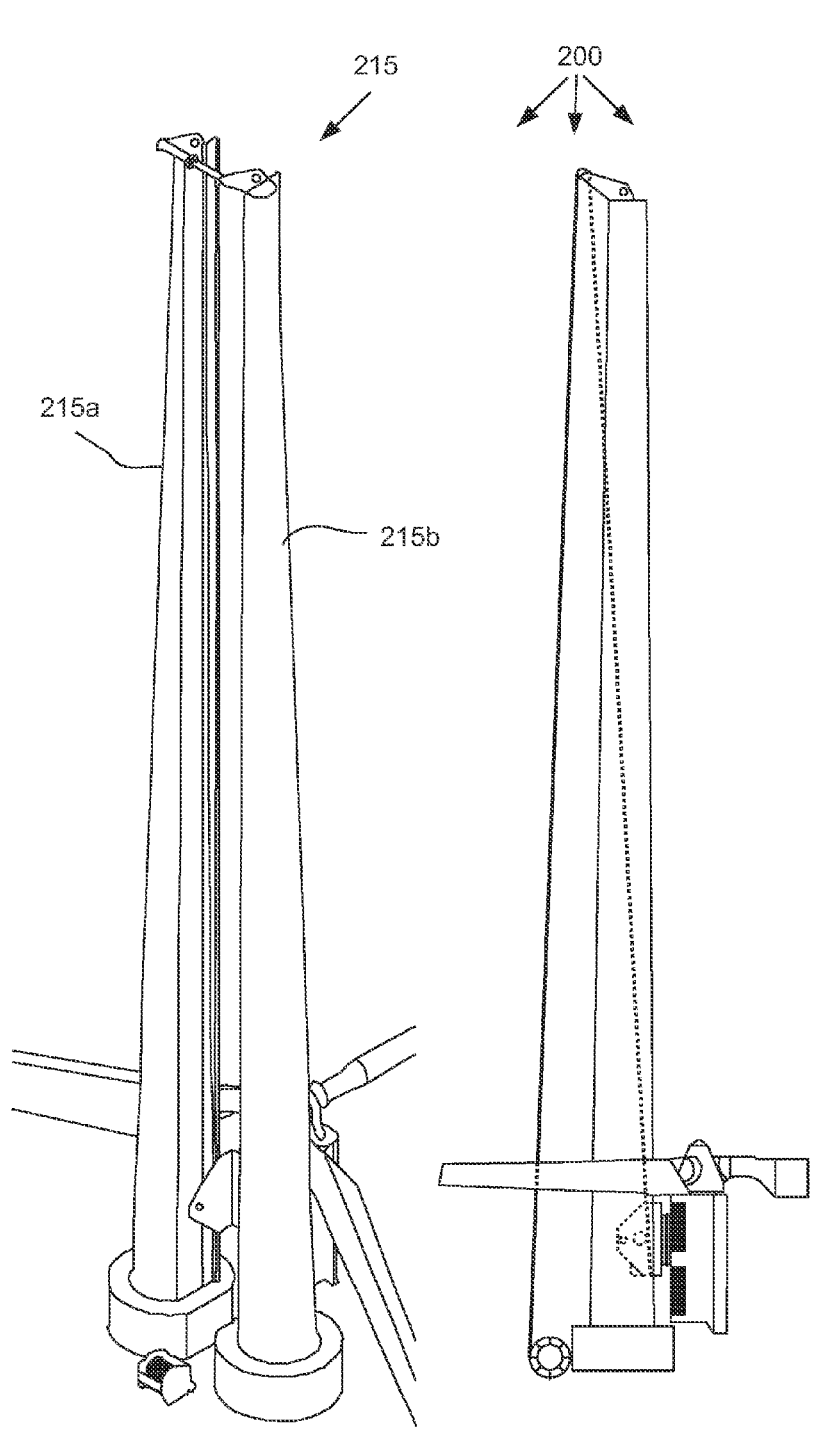
FIGS. 4A-4C illustrate an elevator, according to another embodiment of the present invention.

FIGS. 4A-4C illustrate an elevator 200, according to another embodiment of the present invention. The elevator 200 may be similar to the elevator 100 except that the composite tower 215 has replaced the tower 115. The composite tower 215 may include a plurality (two shown) of legs 215a,b. The composite tower 215 may allow the pivot point to be more closely aligned with a longitudinal centerline of the tower, thereby reducing bending moments on the tower.

Figure 5:
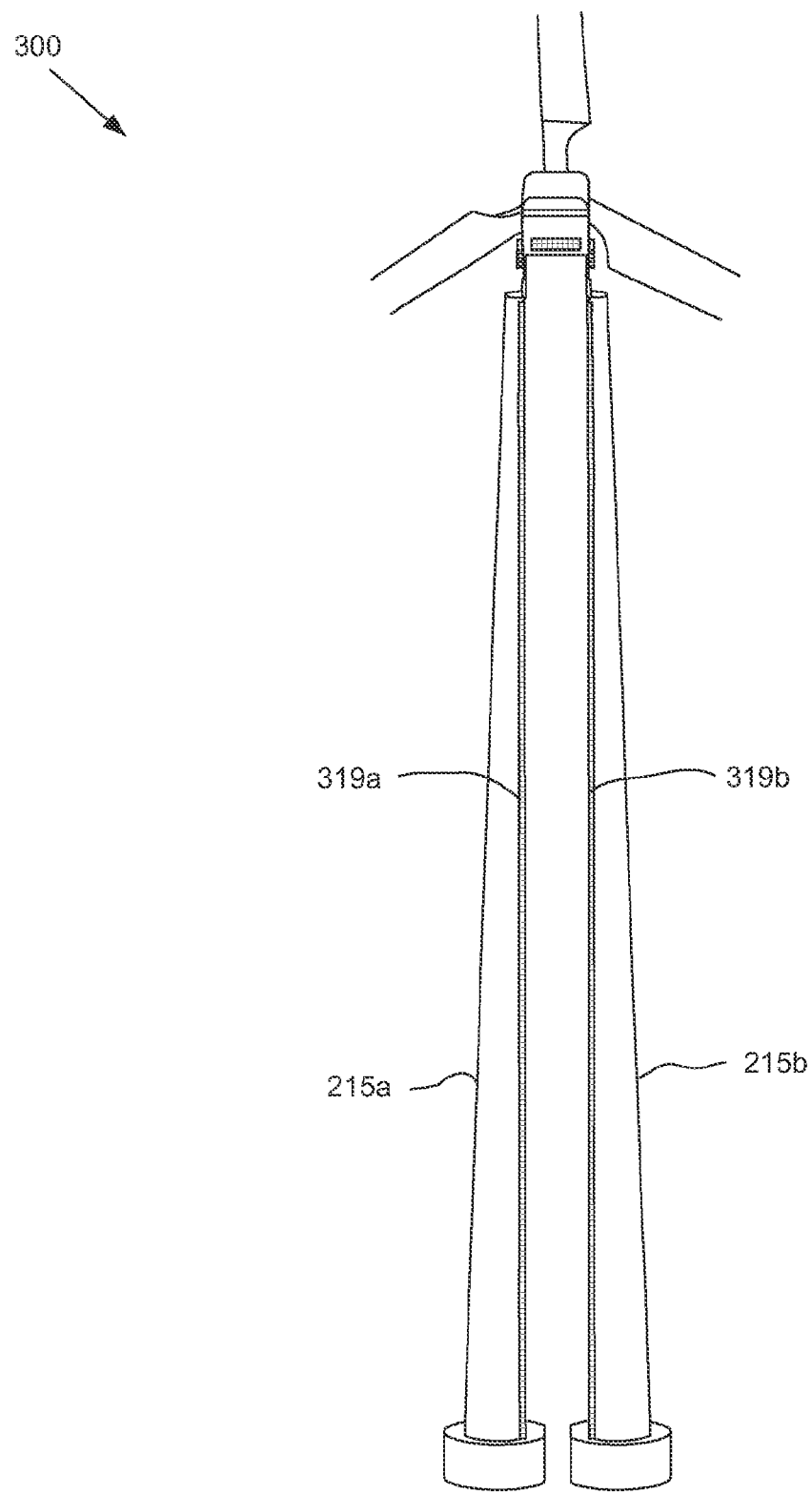
FIG. 5 illustrates an elevator, according to another embodiment of the present invention.
Figure 6A:
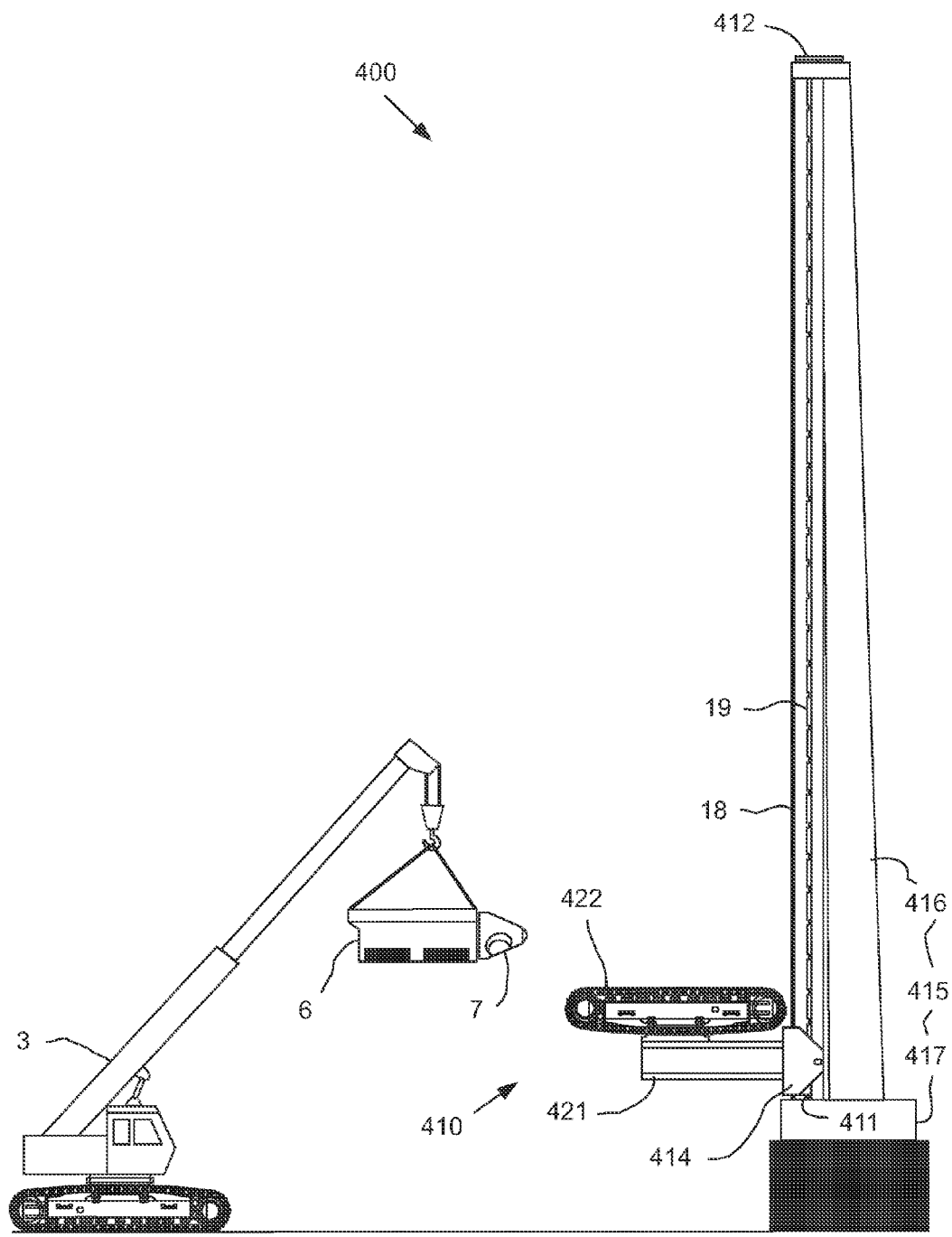
FIGS. 6A-6E illustrate an elevator and method of unloading and lifting a nacelle and rotor using the elevator, according to another embodiment of the present invention.
Figure 6B:
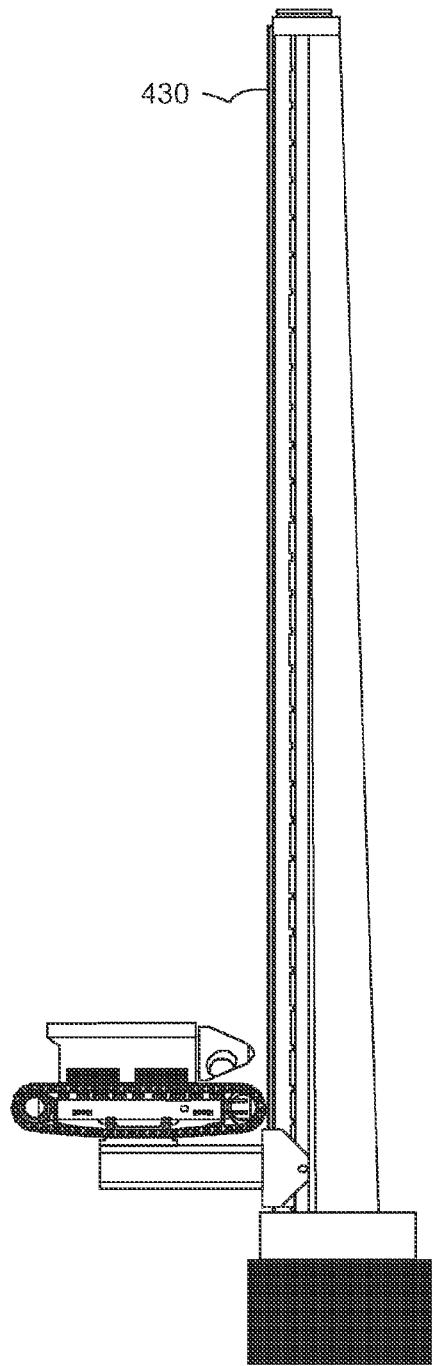
Figure 6C:
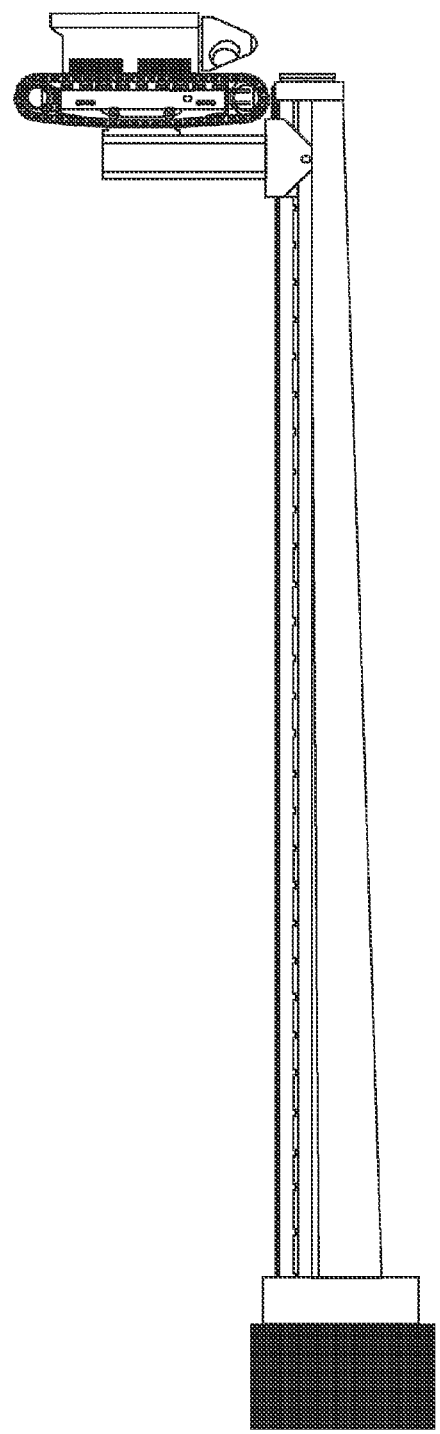
Figure 6D:
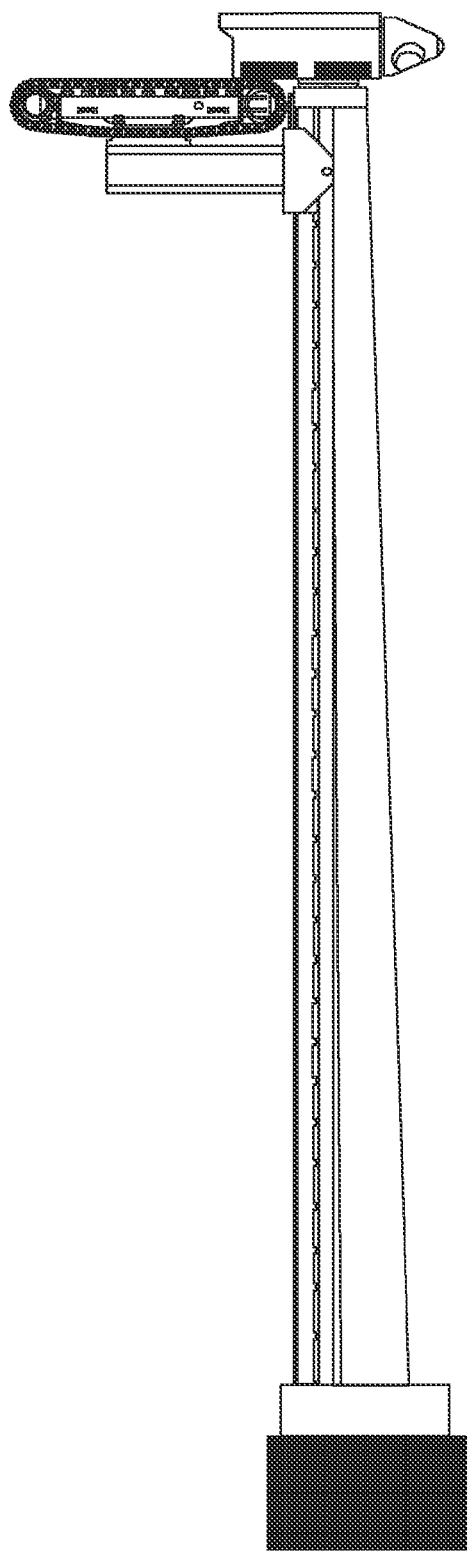
Figure 6E:
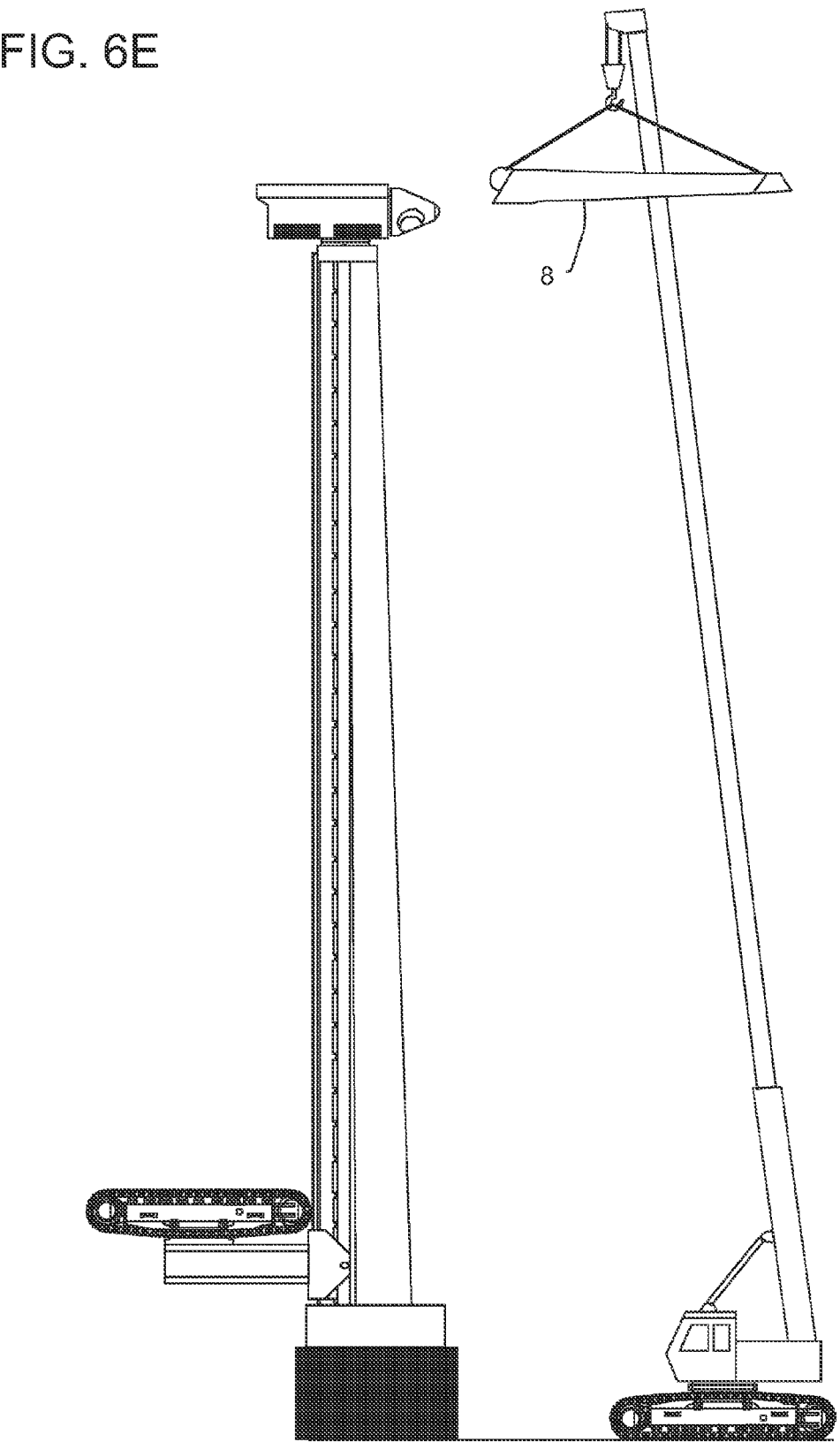

FIG. 5 illustrates an elevator 300, according to another embodiment of the present invention. The elevator 300 may be similar to the elevator 1 except that the composite tower has replaced the tower 15. A rack 319a,b may be disposed along respective guide rails of the respective tower legs 215a, b.

FIGS. 6A-6E illustrate an elevator 400 and method of unloading and lifting a nacelle 6 and rotor 7, 8 using the elevator, according to another embodiment of the present invention. The elevator 400 may include a platform 410, a drive system 411, 419, and a guide system (only guide rail 418 shown). The platform 410 may include a carriage body 414, a base 421, and a conveyor 422. The drive system 411, 419 may be similar to the drive system 11, 19 of the elevator 1. Alternatively, the drive system 411, 419 may be similar to the drive system 130, 135 of the elevator 100.

The conveyor 422 may include a frame and one or more rollers, such as sprockets or wheels, operatively coupled to a belt. The base 421 may connect the conveyor frame the carriage body 414. The conveyor belt may extend around the conveyor frame and be movable relative to the frame. The conveyor rollers may be supported by the conveyor frame so that the rollers may rotate relative to the frame. One of the conveyor rollers may be a driver and the other an idler. The conveyor 422 may further include an electric motor (not shown) having a rotor rotationally connected to the drive roller and a housing of the motor may be connected to the conveyor frame. The conveyor motor may be electrical communication with the power cable 30. Operation of the conveyor motor may move the conveyor belt relative to the conveyor frame.

The guide system may include the rail 418 and the trolley except that the trolley need not include an actuator and may remain engaged with the guide rail during operation of the elevator 400. The bearing 412 and rotary drive may be installed at the top of the tower 415 during assembly of the tower body 416 and base 417. The nacelle 6 and hub 7 may be unloaded from the truck in the horizontal position using the crane 3. The crane 3 may then load the nacelle 6 and hub 7 on to the platform 410 at a base 417 of the tower 415. The drive system 411, 419 may be operated to lift the platform 410, nacelle 6, and hub 7 to a top of the tower 415. The nacelle 6 may remain in the horizontal position during lifting.

The conveyor 422 may then be operated to convey the nacelle 6 and hub 7 horizontally from the platform 410 to the bearing 412. The nacelle 6 and hub 7 may then be connected to the bearing 412. The platform 410 may then be lowered to the tower base 417. The blades 8 may then be connected to the hub 7, such as by using the crane 3. Once lifted and connected to the bearing 412, the nacelle 6 may be electrically connected to the tower 415. The wind turbine may then be operated. Alternatively, one or more of the blades 8 may be connected to the hub 7 at the tower base 417. The remaining blades 8 may then be connected to the hub 7 at the top of the tower 415. Alternatively, the platform 410 may remain at the top of the tower 415 to facilitate connection of the blades 8 to the hub 7. Alternatively, the blades 8 may be connected to the hub 7 after lifting and before conveyance. The elevator 400 may be used with a single leg or composite tower.

While the foregoing is directed to embodiments of the present invention, other and further embodiments of the invention may be devised without departing from the basic scope thereof, and the scope thereof is determined by the claims that follow.

The invention claimed is:

1. An elevator for a wind turbine, comprising:
   a tower having a base, a body, and a guide rail extending along the tower body;
   a carriage movable along the guide rail and having a bearing and rotary drive for receiving a nacelle in a vertical position;
   a drive system for raising the carriage and nacelle along the guide rail; and
   a pivot system for engaging the carriage when the carriage and nacelle arrive at the top of the tower,
   wherein:

the drive system comprises:
  a motor connected to the carriage;
  a pinion connected to a rotor of the motor; and
  a rack extending along the guide rail, and
the pivot system comprises:
  a sensor or switch for detecting arrival of the carriage and nacelle at the tower top;
  a fastener for pivotally connecting the carriage to the tower; and
  a fastener actuator for engaging the fastener with the carriage in response to the detected arrival.

2. The elevator of claim 1, wherein the pivot system further comprises a linear actuator for engaging the carriage and pivoting the carriage and nacelle to a horizontal position.

3. An elevator for a wind turbine, comprising:
  a tower having a base, a body, and a guide rail extending along the tower body;
  a carriage movable along the guide rail and having a bearing and rotary drive for receiving a nacelle in a vertical position;
  a drive system for raising the carriage and nacelle along the guide rail; and
  a pivot system for engaging the carriage when the carriage and nacelle arrive at the top of the tower,
wherein:
  the drive system is operable to pivot the carriage and the nacelle to a horizontal position after the pivot system is engaged with the carriage,
  the drive system comprises:
    a sheave located at a top of the tower; and
    a winch located at a base of the tower and having a load line extending through the sheave and connected to the carriage, and
  the pivot system comprises:
    a sensor or switch for detecting arrival of the carriage and nacelle at the tower top;
    a fastener for pivotally connecting the carriage to the tower; and
    a fastener actuator for engaging the fastener with the carriage in response to the detected arrival.

4. The elevator of claim 3, wherein the pivot system further comprises a linear actuator or damper for controlling tipping of the nacelle and carriage during pivoting.

* * * * *

UNITED STATES PATENT AND TRADEMARK OFFICE
CERTIFICATE OF CORRECTION

| | | |
|---|---|---|
| PATENT NO. | : 9,261,072 B2 | Page 1 of 1 |
| APPLICATION NO. | : 13/468718 | |
| DATED | : February 16, 2016 | |
| INVENTOR(S) | : Daniel E. Davis | |

It is certified that error appears in the above-identified patent and that said Letters Patent is hereby corrected as shown below:

Title Page, (54) and in the Specification, Column 1, Line 1, Title:

Please delete "WIND TURBINE ELEVATOR FOR HOISTING A NAECELLE ALONG A TOWER AND PIVOTING THE NAECELLE AT A TOP OF THE TOWER" and insert -- WIND TURBINE ELEVATOR FOR HOISTING A NACELLE ALONG A TOWER AND PIVOTING THE NACELLE AT A TOP OF THE TOWER -- therefor.

Signed and Sealed this
Tenth Day of May, 2016

Michelle K. Lee
*Director of the United States Patent and Trademark Office*